UNITED STATES PATENT OFFICE.

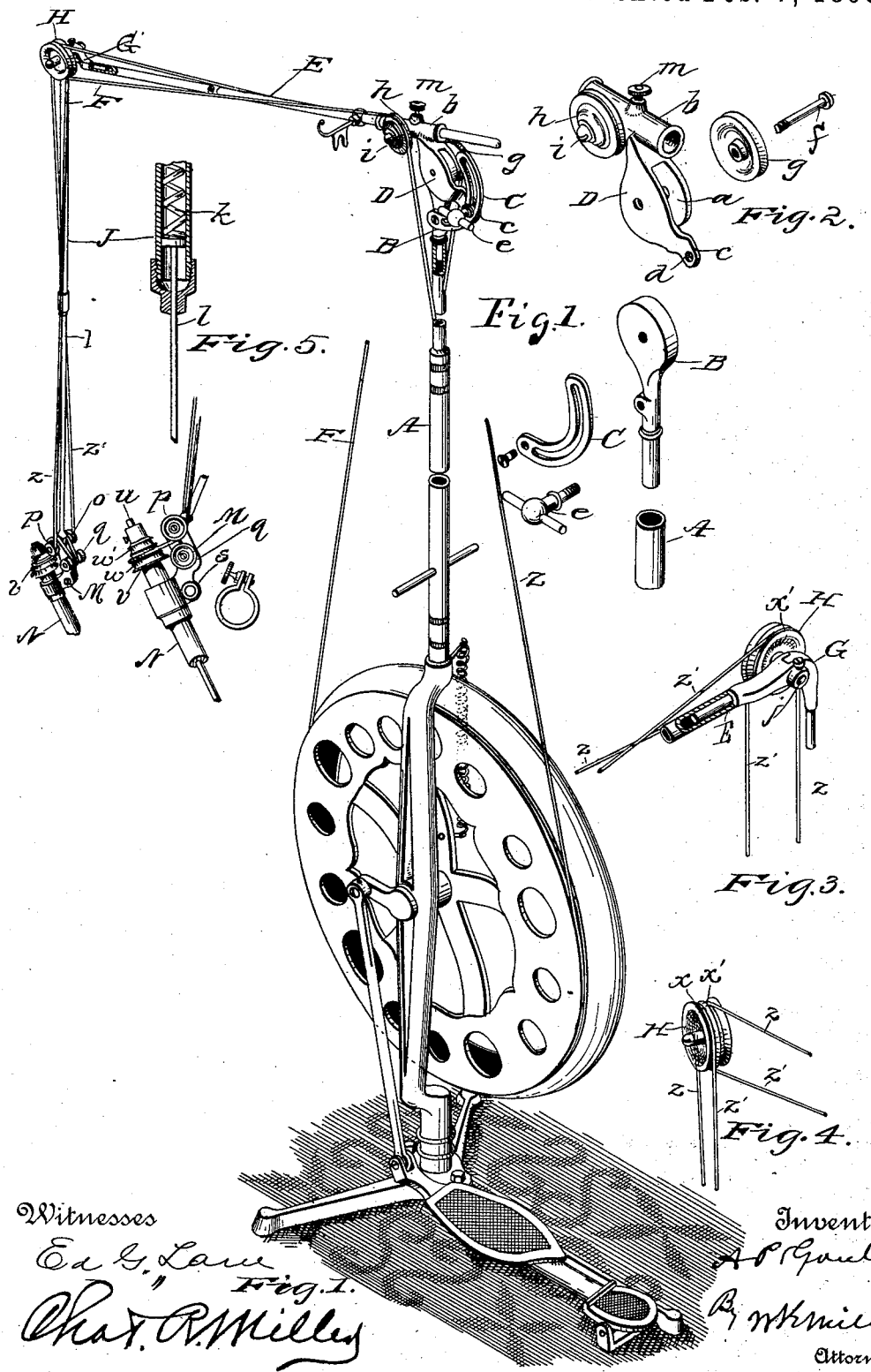

AARON P. GOULD, OF CANTON, OHIO.

DENTAL ENGINE.

SPECIFICATION forming part of Letters Patent No. 491,099, dated February 7, 1893.

Application filed May 31, 1892. Serial No. 435,334. (No model.)

*To all whom it may concern:*

Be it known that I, AARON P. GOULD, a citizen of the United States, and a resident of Canton, county of Stark, State of Ohio, have invented a new and useful Improvement in Dental Engines, of which the following is a full, clear, and exact description, reference being had to the accompanying drawings, making part of this specification.

My invention relates to improvements in dental engines, and consists in providing in a single endless belt engine, means by which the parts may be adjusted to the belt to maintain the desired tension, to change the speed of the tool, and to adjust the position of the horizontal supporting arm.

With these ends in view my invention consists of certain features of construction and combination of parts as will be hereinafter described and pointed out in the claims.

Figure 1 of the accompanying drawings is a view in perspective comprising a dental engine illustrating my invention and a portion of enlarged detail. Fig. 2 a similar view of pulley and support for horizontal arm. Fig. 3 a similar view of pulley at the outer end of horizontal arm. Fig. 4 a similar view of the same pulley showing the manner of putting on the belt. Fig. 5 is a similar view of the hand piece and an enlarged section of the swinging arm.

Similar letters of reference indicate corresponding parts in all of the figures of the drawings.

The base, pedal, and driving wheel are similar to corresponding parts in other and well known machines, and will be referred to only as conjunctional.

A represents the vertical supporting stem, having at its upper end a swiveled head B, to which is pivotally secured a slotted curved arm C, and a sheave and arm support D; said arm support is provided with a central socket $a$ to receive the head B, in which the head is pivotally secured, a tubular or sleeve portion $b$ to receive and support the arm E a projecting arm $c$ having a threaded aperture $d$ in which the thumb screw $e$ is engaged. The pin $f$ by which the support D is secured to the head B, serves as an axle pin for the sheave $g$, the corresponding sheave $h$ is secured to the side of the tube $b$ by an axle pin $i$. The inner end of the arm E is adapted to slide in the sleeve $b$ for the purpose of adjusting the pulleys on the hand piece or tool holder, and drive wheel to the belt F.

At the outer end of the arm E is provided a swiveled elbow G, the pivot $j$ that forms the joint also serves as an axle pin for the double sheave pulley H. The inner end of the swinging arm J is secured to the elbow G, this portion of the arm is hollow for the purpose of receiving the tension spring $k$, and the end of the adjustable portion $l$ the spring $k$ resting against the end of the adjustable portion $l$ of the arm J serves as a constant tension by forcing the pulleys on the hand piece out against the driving belt. This movement must however be limited to prevent too great a pressure on the belt and thereby cause the machine to run hard. Thereupon to adapt the parts to the length of the belt, the adjustment between the arm E and the support D is provided, the arm to slide in the sleeve $b$ is secured in desired adjustment by the thumb screw $m$.

At the outer end of the swinging arm J is provided an L shaped clamp M having a cylindrical portion $n$ and parallel arms $o$ the latter to serve as a support for the sheaves $p$ $p$, and $q$ $q$ and a pivotal connection with the outer end portion $l$ of the swinging arm J, the cylindrical portion to receive the hand piece N, to which it is secured by the thumb piece $s$.

At the end of the tool holder $u$ is provided a conical pulley V having about its face two annular grooves forming sheaves $w$ and $w'$ of different diameters as shown in Figs. 1 and 5. By the use of the clamp M, either of the said sheaves $w$ or $w'$ may be held at the desired point between the sheaves $p$ and $q$, and to change the speed of the tool, it is only necessary to place the large or small sheave in position to receive the belt F by adjusting the hand piece in the clamp M.

The intermediate sheave H at the joint between the arms E and J is provided with two annular grooves side by side of equal depth thus forming a double sheave. In placing the belt F on the machine, the $z$ side of the belt is passed up from the drive wheel and over the sheaves $g$ and $x'$ and down and about the pulley V, and up as $z'$ to the inside of sheave $x'$ on wheel H, around which it is passed to the under-side and thence to and over sheave $h$ and down the drive wheel. The belt when so placed on and about the wheel H, will travel in the same direction about the wheel H or sheaves $x$ and $z'$.

The $z$ side of the belt is the pulling side which is always kept taut by the power applied to drive the tool, $z'$ is the slack side which is turned about the sheave or groove $x$ in the wheel H, by which it is held in position and the liability to fly or run off very much reduced.

Having thus fully described the nature and object of my invention, what I claim and desire to secure by Letters Patent is:

1. The combination in a dental engine of a vertical support, a head having a swiveled engagement therewith, a curved slotted arm pivoted to said head, an arm support pivoted to said head, independently of the curved slotted arm said arm support provided with an extension, and a sleeve portion, an arm inserted in said sleeve portion, means for retaining the arm in adjusted position therein, and a set-screw carried by said extension and engaged with the curved slotted arm.

2. The combination in a dental engine of the drive wheel, vertical support, the swiveled head and the shaft support, with two sheaves carried by the shaft support, the hand piece N pivotally secured to the arm J, clamp M adjustable thereon, sheaves $p$ and $q$ sheaves $w$ $w'$ intermediate double sheave H and the belt F.

3. The combination in a dental engine of the hand piece N and tool holder $u$ with the adjustable sheave holder M. and cone sheaves $v'$.

In testimony whereof I have hereunto set my hand this 23d day of May, A. D. 1892.

AARON P. GOULD.

Witnesses:
CHAS. R. MILLER,
BENJ. G. COWL.